United States Patent
Murray et al.

(10) Patent No.: US 12,464,551 B2
(45) Date of Patent: Nov. 4, 2025

(54) SYSTEM AND METHOD FOR IMPLEMENTING PDSCH ENHANCEMENTS FOR RADAR COEXISTENCE

(71) Applicant: INTERDIGITAL PATENT HOLDINGS, INC., Wilmington, DE (US)

(72) Inventors: Joseph Murray, Schwenksville, PA (US); Alpaslan Demir, East Meadow, NY (US); Sudhir Pattar, Mount Laurel, NJ (US); Philip Pietraski, Jericho, NY (US); Joe Huang, Montville, NJ (US); Muhammad Fazili, Audubon, PA (US); Tariq Elkourdi, New York, NY (US); Patrick Cabrol, Bayshore, NY (US); Paul Russell, Lawrence, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 342 days.

(21) Appl. No.: 17/896,260

(22) Filed: Aug. 26, 2022

(65) Prior Publication Data
US 2023/0069431 A1 Mar. 2, 2023

Related U.S. Application Data

(60) Provisional application No. 63/237,984, filed on Aug. 27, 2021.

(51) Int. Cl.
*H04W 72/542* (2023.01)
*H04W 72/23* (2023.01)

(52) U.S. Cl.
CPC ......... *H04W 72/542* (2023.01); *H04W 72/23* (2023.01)

(58) Field of Classification Search
CPC .............. H04W 72/542; H04W 72/23; H04W 72/1273; H04W 72/541; H04W 28/20;
(Continued)

(56) References Cited

U.S. PATENT DOCUMENTS

2015/0296508 A1* 10/2015 Fan .................. H04W 72/1273
370/329
2022/0107384 A1* 4/2022 Duan ................... H04B 7/0695
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
(Continued)

Primary Examiner — Gary Mui
Assistant Examiner — Adam Lane Rusterholz
(74) Attorney, Agent, or Firm — VOLPE KOENIG

(57) ABSTRACT

A method performed by a base station may comprise: receiving RADAR information; sending scheduling information, wherein the scheduling information includes a set of time and frequency resources associated with a physical downlink transmission that avoid RADAR interference, and wherein the set of time and frequency resources is determined based on the RADAR information; and sending the physical downlink transmission using resources based on the set of time and frequency resources.

10 Claims, 12 Drawing Sheets

(58) Field of Classification Search
CPC ......... H04W 72/1215; H04W 72/0446; H04W 72/0453
See application file for complete search history.

(56) References Cited

U.S. PATENT DOCUMENTS

| | | | | |
|---|---|---|---|---|
| 2022/0113400 | A1* | 4/2022 | Manolakos | G01S 7/006 |
| 2022/0232524 | A1* | 7/2022 | Kaikkonen | H04W 72/02 |
| 2022/0317241 | A1* | 10/2022 | Aduru | H04W 16/14 |
| 2023/0189315 | A1* | 6/2023 | Haustein | H04W 24/02 |
| | | | | 370/252 |
| 2023/0266434 | A1* | 8/2023 | Kalantari | H04W 72/541 |
| | | | | 342/159 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology - Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications, IEEE Std. 802.11-2020 (Dec. 3, 2020).
Third Generation Partnership Project, "Technical Specification Group Radio Access Network; NR; Physical layer procedures for control (Release 15)," 3GPP TS 38.213 V15.2.0 (Jun. 2018).
Third Generation Partnership Project, "Technical Specification Group Radio Access Network; NR; Physical layer procedures for control (Release 16)," 3GPP TS 38.213 V16.6.0 (Jun. 2021).
Third Generation Partnership Project, "Technical Specification Group Radio Access Network; NR; Physical layer procedures for control (Release 16)," 3GPP TS 38.213 V16.10.0 (Jun. 2022).
Third Generation Partnership Project, "Technical Specification Group Radio Access Network; NR; Physical layer procedures for control (Release 17)," 3GPP TS 38.213 V17.2.0 (Jun. 2022).
Third Generation Partnership Project, "Technical Specification Group Radio Access Network; NR; Physical layer procedures for data (Release 15)," 3GPP TS 38.214 V15.11.0 (Sep. 2020).
Third Generation Partnership Project, "Technical Specification Group Radio Access Network; NR; Physical layer procedures for data (Release 17)," 3GPP TS 38.214 V16.6.0 (Jun. 2021).
Third Generation Partnership Project, "Technical Specification Group Radio Access Network; NR; Physical layer procedures for data (Release 17)," 3GPP TS 38.214 V16.10.0 (Jun. 2022).
Third Generation Partnership Project, "Technical Specification Group Radio Access Network; NR; Physical layer procedures for data (Release 17)," 3GPP TS 38.214 V17.2.0 (Jun. 2022).

* cited by examiner

SYSTEM AND METHOD FOR IMPLEMENTING PDSCH ENHANCEMENTS FOR RADAR COEXISTENCE

CROSS-REFERENCE TO RELATED APPLICATIONS

This application claims the benefit of U.S. Provisional Application No. 63/237,984 filed Aug. 27, 2021, the contents of which are incorporated herein by reference.

BACKGROUND

Interference on wireless communication systems caused by RADAR may exist for a short time duration that occurs periodically with the rotation of RADAR. Legacy scheduling mechanisms allocate resources that are contiguous in the time domain, thereby requiring the resources allocated to a physical downlink channel to fit in symbols of a slot that occur before or after the RADAR interference. This "shortening" of the physical downlink channel duration, would result in some time/frequency resources going unused, even though they did not incur interference from the RADAR, thereby reducing the downlink capacity. Accordingly, there is a need for new mechanisms to ensure robust and efficient physical downlink transmission and reception can occur when coexisting with RADAR systems.

SUMMARY

A method performed by a base station may comprise: receiving RADAR information; sending scheduling information, wherein the scheduling information includes a set of time and frequency resources associated with a physical downlink transmission that avoid RADAR interference, and wherein the set of time and frequency resources is determined based on the RADAR information; and sending the physical downlink transmission using resources based on the set of time and frequency resources.

The RADAR information may comprise one or more of angle of arrival (AOA), frequency, or bandwidth (BW). The set of time and frequency resources may further be based on a location of a wireless transmit/receive unit (WTRU). The set of time and frequency resources may be further based on a RADAR interference threshold. The set of time and frequency resources may be further based on a timing drift associated with RADAR. The physical downlink transmission may include a physical downlink shared channel transmission. The scheduling information may be sent in a downlink control information.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

One or more of the following acronyms may be used herein: (AOA) Angle of Arrival; (BW) Bandwidth; (BWP) Bandwidth Part; (CCE) Control Channel Element; (CORESET) Control Resource Set; (CRC) Cyclic Redundancy Check; (C-RNTI) Cell Specific Radio Network Temporary Identifier; (CS-RNTI) Configured Scheduling Radio Network Temporary Identifier; (CSI-RS) Channel State Information Reference Signal; (DCI) Downlink Control Information; (DMRS) Demodulation Reference Signal; (ENSURED-5G) Enhanced Security and Co-Existence for DoD-5G; (gNB) NR NodeB; (MAC) Medium Access Control; (MAC-CE) MAC Control Element; (MCS) Modulation and Coding Scheme; (MCS-C-RNTI) Modulation and Coding Scheme Cell Specific Radio Network Temporary Identifier; (NR) New Radio; (OAM) Operations Administration and Maintenance; (OFDM) Orthogonal Frequency Division Multiplexing; (PDCCH) Physical Downlink Control Channel; (PDSCH) Physical Downlink Shared Channel; (PHY) Physical Layer; (QCL) Quasi-Collocated; (QOS) Quality of Service; (RADAR) Radio Detection and Ranging; (RB) Resource Block; (RE) Resource Element; (REG) Resource Element Group; (RRC) Radio Resource Control; (RV) Redundancy Version; (SSB) SS/PBCH block; (SPS) Semi-Persistent Scheduling; and (UE) User Equipment.

Figure 1A:
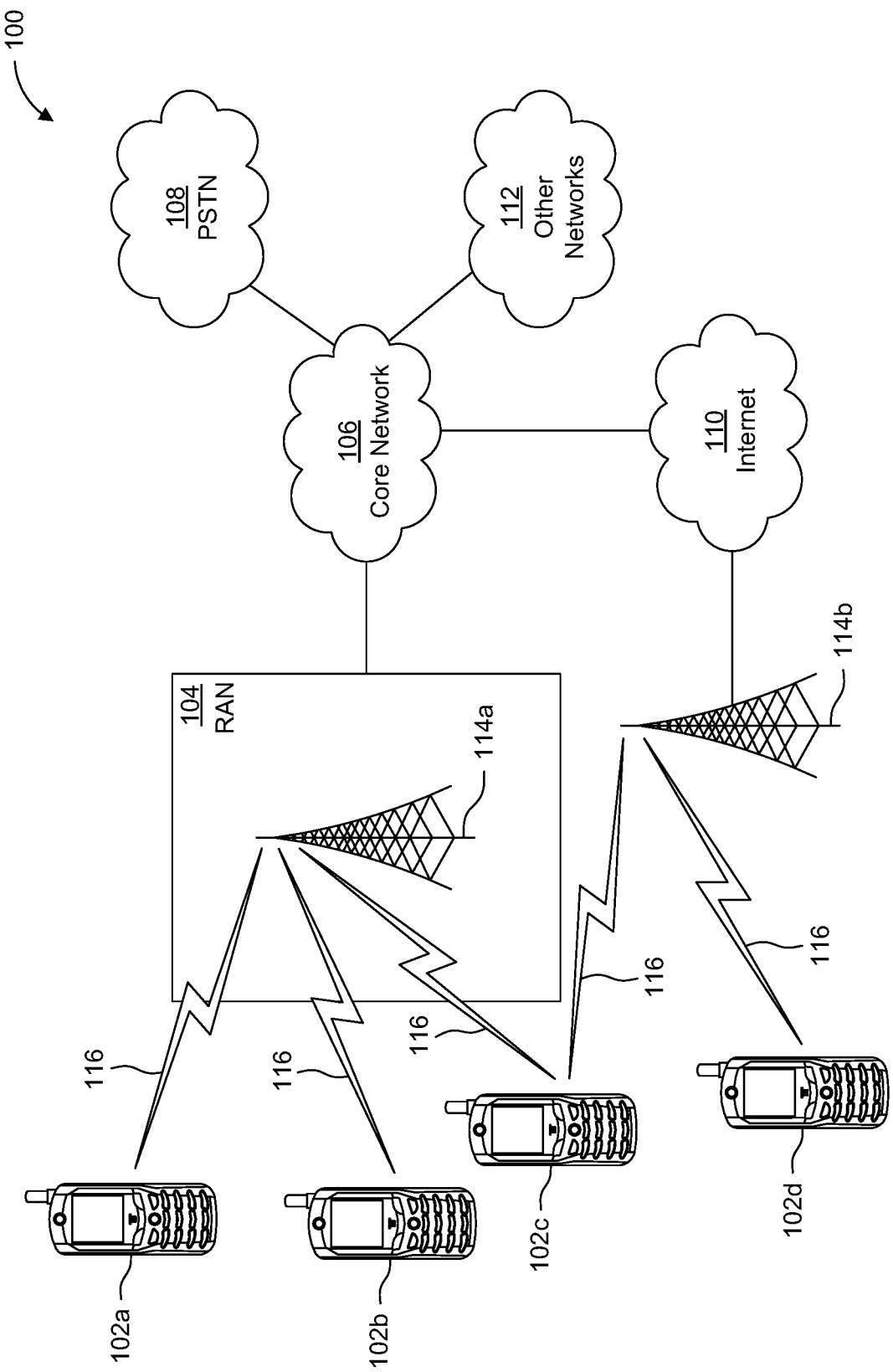
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
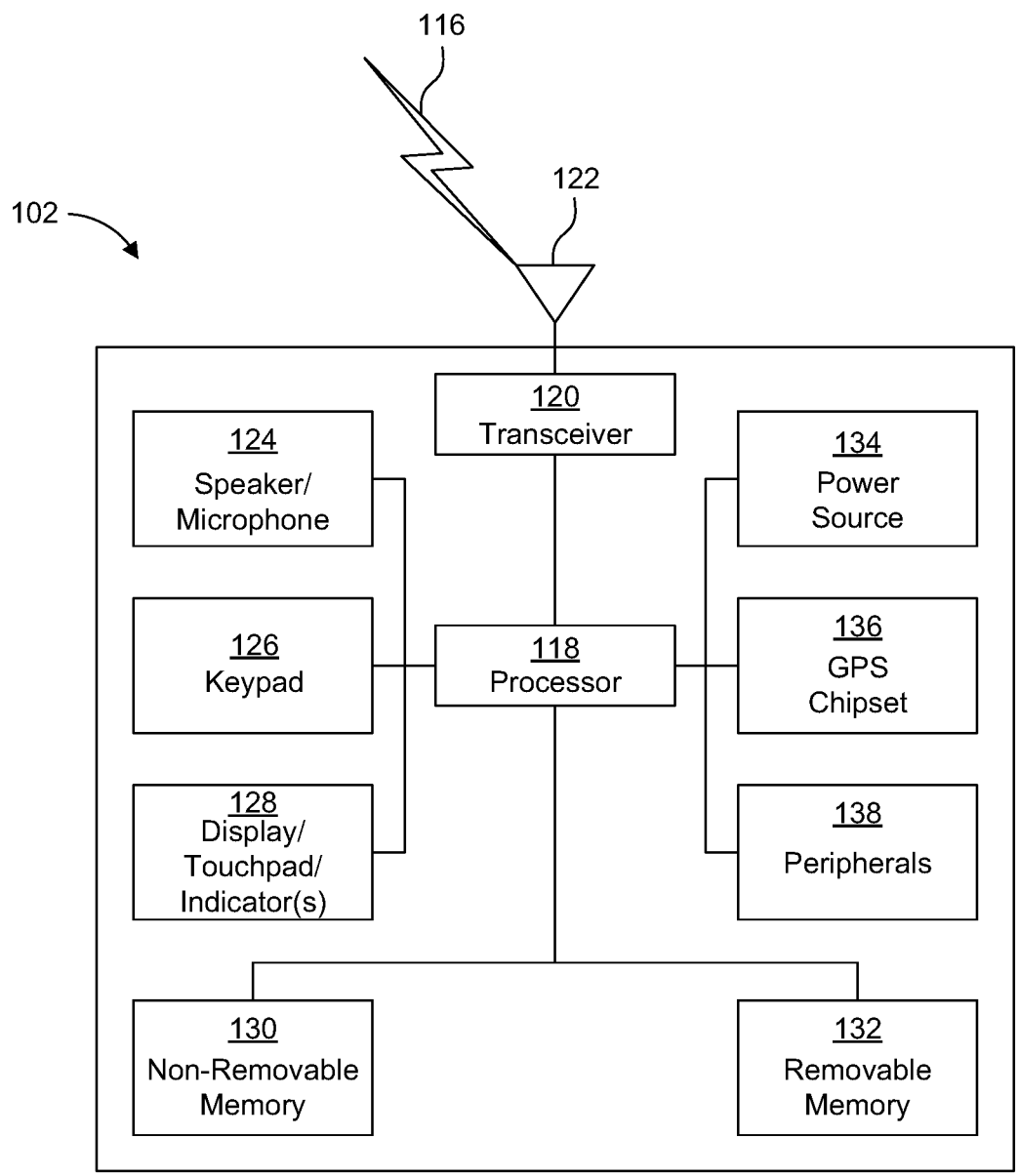
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
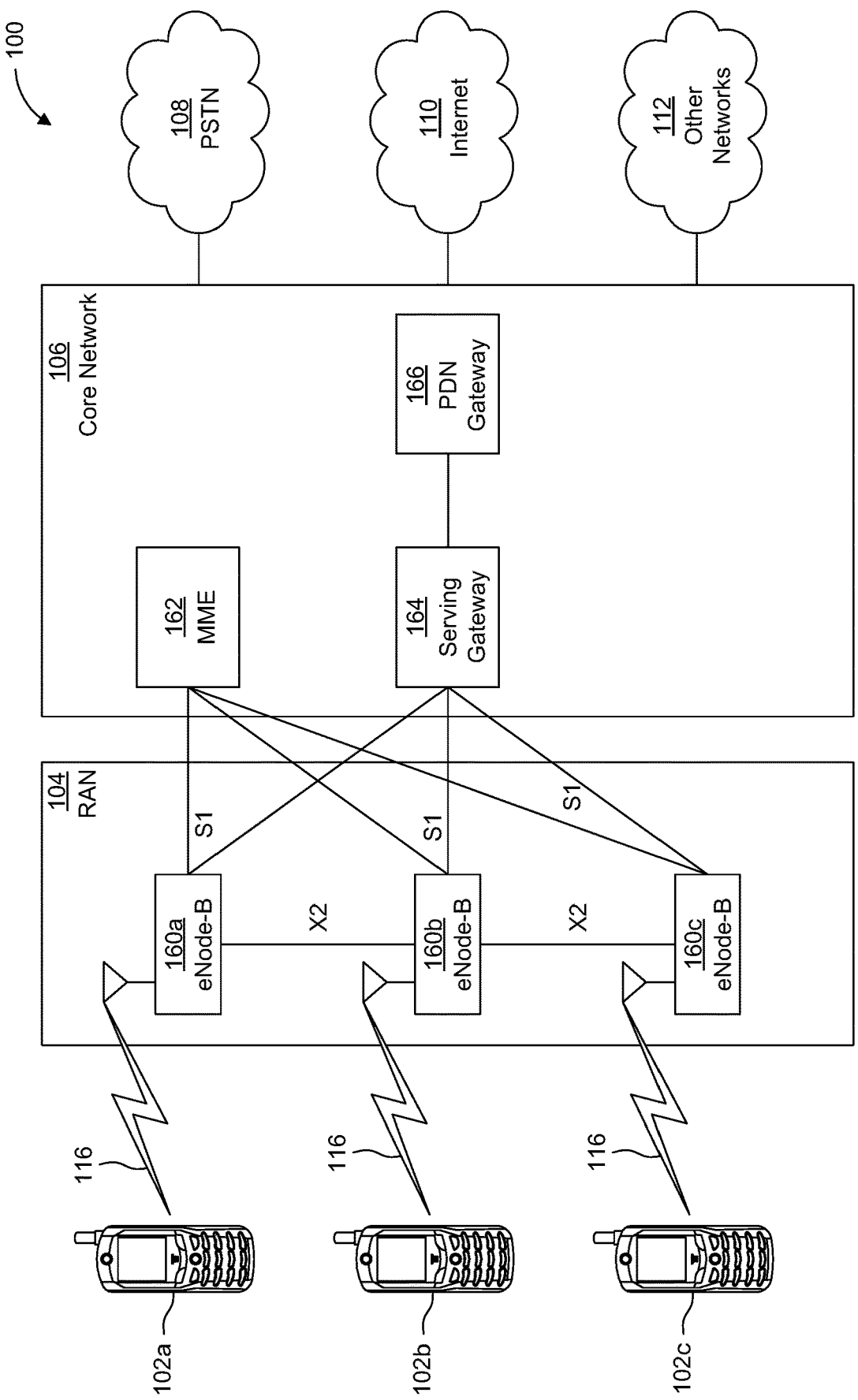
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
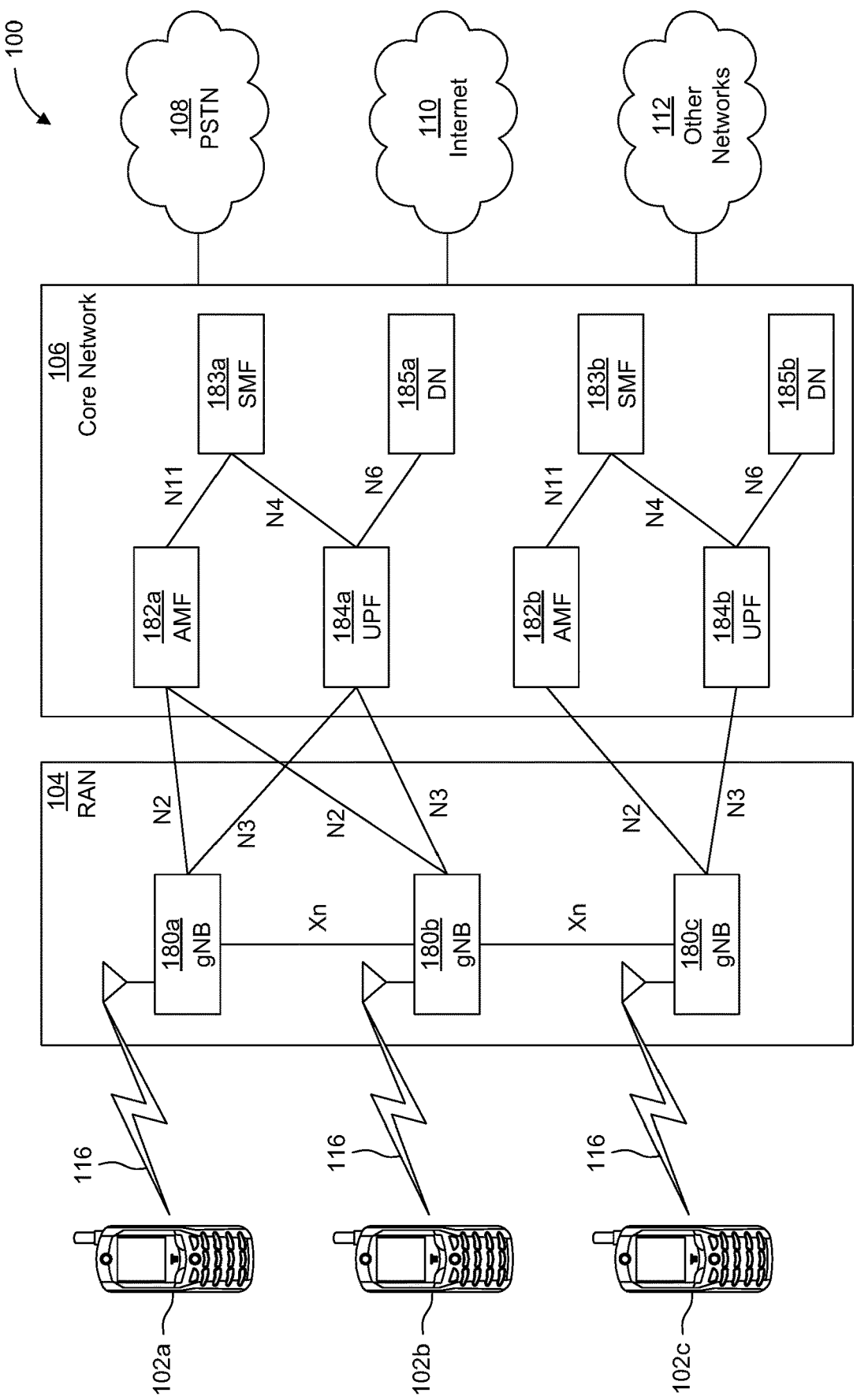
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

As disclosed herein, reference to a WTRU may reference one or more WTRUs. As disclosed herein, a network node may reference one or more network nodes, working collaboratively (e.g., exchanging information to achieve a desired result) and/or working independently. As disclosed herein, a network node may refer one or more functional entities and/or device disclosed herein (e.g., a base station, such as a gNB).

In one or more embodiments, there may be a physical downlink shared channel (PDSCH) resource mapping with resource block (RB) symbol level granularity. A WTRU (e.g., a UE) may be configured with one or more higher layer parameters indicating Resource Elements (Res) declared as not available for a PDSCH; reference to a PDSCH may be interchangeable with one or more PDSCH transmission(s) as disclosed herein. For example, rateMatchPatternToAddModList given by PDSCH-Config, by ServingCellConfig or by ServingCellConfigCommon and configuring up to 4 RateMatchPattern(s) per BWP and up to 4 RateMatchPattern(s) per serving-cell.

A RateMatchPattern may contain within a BWP, when provided by PDSCH-Config or within a serving cell when provided by ServingCellConfig or ServingCellConfigCommon, a pair of reserved resources with numerology provided by a higher layer parameter such as subcarrierSpacing given by RateMatchPattern when configured per serving cell or by the numerology of an associated BWP when configured per BWP. The pair of reserved resources may be respectively indicated by a Resource Block (RB) level bitmap (e.g., higher layer parameter ResourceBlocks given by RateMatchPattern) with 1RB granularity and a symbol level bitmap spanning one or two slots (e.g., higher layer parameters symbolsInResourceBlock given by RateMatchPattern) for which the reserved RBs apply.

A bit value equal to 1 in the RB and symbol level bitmaps may indicate that the corresponding resource is not available for a PDSCH transmission. For each pair of RB and symbol level bitmaps, a WTRU may be configured with a time-domain pattern (e.g., higher layer parameter periodicityAndPattern given by RateMatchPattern), where each bit of periodicityAndPattern corresponds to a unit equal to a duration of the symbol level bitmap, and a bit value equal to 1 indicates that the pair is present in the unit. The periodicityAndPattern may be {1, 2, 4, 5, 8, 10, 20 or 40} units long, but maximum of 40 ms. The first symbol of periodicityAndPattern every 40 ms/P periods is a first symbol in frame nf mod 4=0, where P is the duration of periodicityAndPattern in units of ms. When periodicityAndPattern is not configured for a pair, for a symbol level bitmap spanning two slots, the bits of the first and second slots may correspond respectively to even and odd slots of a radio frame.

For a symbol level bitmap spanning one slot, the bits of the slot may correspond to every slot of a radio frame. The pair may also be included in one or two groups of resource sets (for example, higher layer parameters rateMatchPatternGroup1 and rateMatchPatternGroup2). The rateMatchPatternToAddModList given by ServingCellConfig or ServingCellConfigCommon configuration in numerology u may applies only to PDSCH transmissions of the same numerology u.

A RateMatchPattern may contain, within a BWP, a frequency domain resource of a Control Resource Set (CORESET) configured by ControlResourceSet with controlResourceSetId or ControlResourceSetZero and a time domain resource determined by higher layer parameters such as monitoringSlotPeriodicityAndOffset, duration and monitoringSymbols WithinSlot of all search-space-sets configured by SearchSpace and time domain resources of search-space-set zero. Search space-set zero may be configured by searchSpaceZero associated with the CORESET as well as CORESET duration which may be configured by ControlResourceSet with controlResourceSetId or ControlResourceSetZero. The resource not available for PDSCH transmission may be included in one or two groups of resource sets (e.g., higher layer parameters rateMatchPatternGroup1 and rateMatchPatternGroup2).

A configured group, for example, rateMatchPatternGroup1 or rateMatchPatternGroup2, may contain a list of indices of RateMatchPattern(s) forming a union of resource-sets not available for a PDSCH transmission dynamically if a corresponding bit of the Rate matching indicator field of the DCI format 1_1 scheduling the PDSCH is equal to 1. The REs corresponding to the union of resource-sets configured by RateMatchPattern(s) that are not included in either of the two groups may not be available for a PDSCH transmission scheduled by a DCI format 1_0, a PDSCH transmission scheduled by a DCI format 1_1, and PDSCH transmissions with Semi-Persistent Scheduling (SPS). When receiving a PDSCH transmission scheduled by a DCI format 1_0 or PDSCH transmissions with SPS activated by a DCI format 1_0, the REs corresponding to configured resources in rateMatchPatternGroup1 or rateMatchPatternGroup2 may not be available for the scheduled PDSCH transmission or the activated PDSCHs with SPS. When receiving PDSCHs with SPS activated by a DCI format 1_1, the REs corresponding to configured resources in rateMatchPatternGroup1 or rateMatchPatternGroup2 may not be available for the PDSCHs with SPS if a corresponding bit of the Rate matching indicator field of the DCI format 1_1 activating the PDSCHs with SPS is equal to 1.

For a bitmap pair included in one or two groups of resource sets, the dynamic indication of availability for PDSCH transmissions may apply to a set of slot(s) where the rateMatchPatternToAddModList is present among the slots of scheduled PDSCH.

If a WTRU monitors Physical Downlink Control Channel (PDCCH) candidates of aggregation levels 8 and 16 with the same starting Control Channel Element (CCE) index in non-interleaved CORESET spanning one OFDM symbol and if a detected PDCCH scheduling the PDSCH has aggregation level 8, the resources corresponding to the aggregation level 16 PDCCH candidate may not be available for the PDSCH. As described herein, PDCCH may be interchangeable with one or more PDCCH transmission(s).

If a PDSCH transmission scheduled by a PDCCH transmission overlaps with resources in the CORESET containing the PDCCH transmission, the resources corresponding to a union of the detected PDCCH transmission that scheduled the PDSCH transmission and associated PDCCH DM-RS may not be available for the PDSCH transmission. When precoderGranularity configured in a CORESET, where the PDCCH was detected is equal to allContiguousRBs, the associated PDCCH DM-RS may be DM-RS in all Resource Element Groups (REGs) of the CORESET. Otherwise, the associated DM-RS are the DM-RS in REGs of the PDCCH.

In one or more embodiments, there may be PDSCH aggregation. When receiving PDSCH transmissions scheduled by DCI format 1_1 in PDCCH with Cyclic Redundancy Check (CRC) scrambled by C-RNTI, MCS-C-RNTI, CS-RNTI, or when receiving PDSCH transmissions scheduled without a corresponding PDCCH transmission using spsConfig and activated by DCI format 1_1, if a WTRU is configured with pdsch-AggregationFactor, the same symbol allocation may be applied across the pdsch-AggregationFactor consecutive slots. The WTRU may expect that the transport block (TB) is repeated within each symbol allocation among each of the pdsch-AggregationFactor consecutive slots and the PDSCH may be limited to a single transmission layer. The redundancy version to be applied on the $n^{th}$ transmission occasion of the TB, where n=0, 1, . . . pdsch-AggregationFactor−1, may be determined according to Table 1 and the "$rv_{id}$ indicated by the DCI scheduling the PDSCH" in Table 1 below is assumed to be 0 for a PDSCH transmission scheduled without a corresponding PDCCH transmission using sps-Config and activated by DCI format 1_1. A PDSCH reception in a slot of a multi-slot PDSCH reception may be omitted according to the conditions in some cases.

TABLE 1

Applied Redundancy Version when pdsch-AggregationFactor is Present

| $rv_{id}$ Indicated by the DCI Scheduling the PDSCH | $rv_{id}$ to be Applied to $n^{th}$ Transmission Occasion | | | |
| --- | --- | --- | --- | --- |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In some scenarios, a cellular network may need to be deployed in the presence of high-power narrowband interferers (e.g., RADARs). Although in some cases, some functionality provided by 5G may be used to provide some level of coexistence with RADARs. Further enhancements may be required to realize the full 5G potential.

For example, a scheduling strategy may involve transmitting a PDSCH transmission to a WTRU using slot-based scheduling, where the network node may dynamically allocate time/frequency resources for the PDSCH transmission. If the network node is unaware of the operating characteristics of RADAR, the network node may be unable to schedule PDSCH transmission using time/frequency resources that do not incur interference from the RADAR.

Furthermore, in some scenarios, the interference caused by the RADAR may exist for a short time duration that occurs periodically with the rotation of the RADAR. Some scheduling mechanisms may allocate resources that are contiguous in the time domain, thereby requiring the resources allocated to the PDSCH to fit in the symbols of the slot that occur before or after the RADAR interference. This "shortening" of the PDSCH duration may result in some time/frequency resources going unused, even though they did not incur interference from the RADAR, thereby reducing the downlink capacity. And for some WTRUs (e.g., WTRUs only supporting PDSCH Mapping Type A) the PDSCH may be constrained to start in the beginning symbols of the slot, providing even less flexibility in allocating the PDSCH when coexisting with a RADAR.

Figure 2:
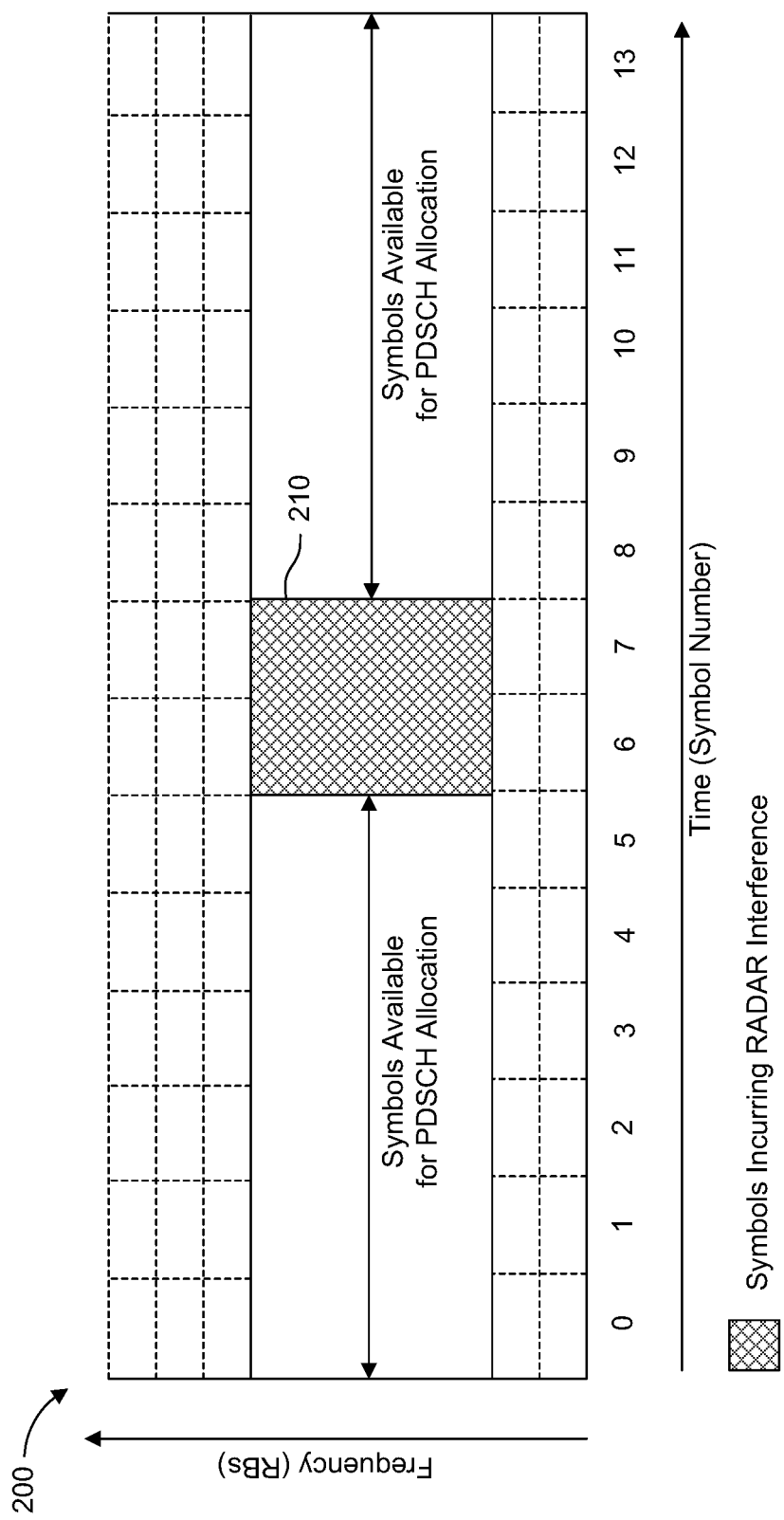
FIG. 2 is an illustration of an example where symbols incur RADAR interference during a PDSCH scheduling interval.

FIG. 2 shows an example of resources assignments in a slot 200. In the slot 200, resources in time symbols 6 and 7 may incur RADAR interference. Accordingly, the shaded reserved resources 210 address the scenario where the RADAR is operating such that the PDSCH transmission would incur interference during symbols 5 and 6 across the entire allocated PDSCH BW. Symbols 0-5 and 8-13 remain available for PDSCH transmissions. The frequency and BW of the RADAR burst may be used to determine the frequency resources allocated as reserved resources; and the start time and duration of a RADAR burst may be used to determine the symbols allocated as reserved resources.

Accordingly, there is a need for mechanisms to ensure robust and efficient transmit/receive operations of transmissions (e.g., PDSCH, control transmissions, data transmissions, reference transmissions, etc.) that can occur with specific types of interference (e.g., RADAR).

In one approach, resources for one or more transmissions may be reserved in order to avoid interference. For example, to coexist with a RADAR, a network node may avoid using time/frequency resources that may incur interference from the RADAR. These time and/or frequency resources may be referred to as "reserved time/frequency resources" or simply "reserved resources". The reserved resources may correspond to contiguous or non-contiguous time and/or frequency resources. The reserved resources may correspond to one or more Resource Elements (RE) or Resource Blocks (RB) that occur during one of more symbols allocated for a transmission (e.g., PDSCH). The reserved resources may be configured on a cell or BWP level using broadcast or dedicated higher layer signaling.

In one approach, the reserved resources may be to be determined based on one or more pieces of information. For example, the network node may use information characterizing the operation of the RADAR to determine the reserved resources. The network node may receive this information from an external entity. Alternatively, the network node may perform measurements to determine the information characterizing the operation of the RADAR. In another alternative, measurements performed by the network node may be used in combination with information provided by an external entity to characterize the operation of the RADAR.

Figure 3:
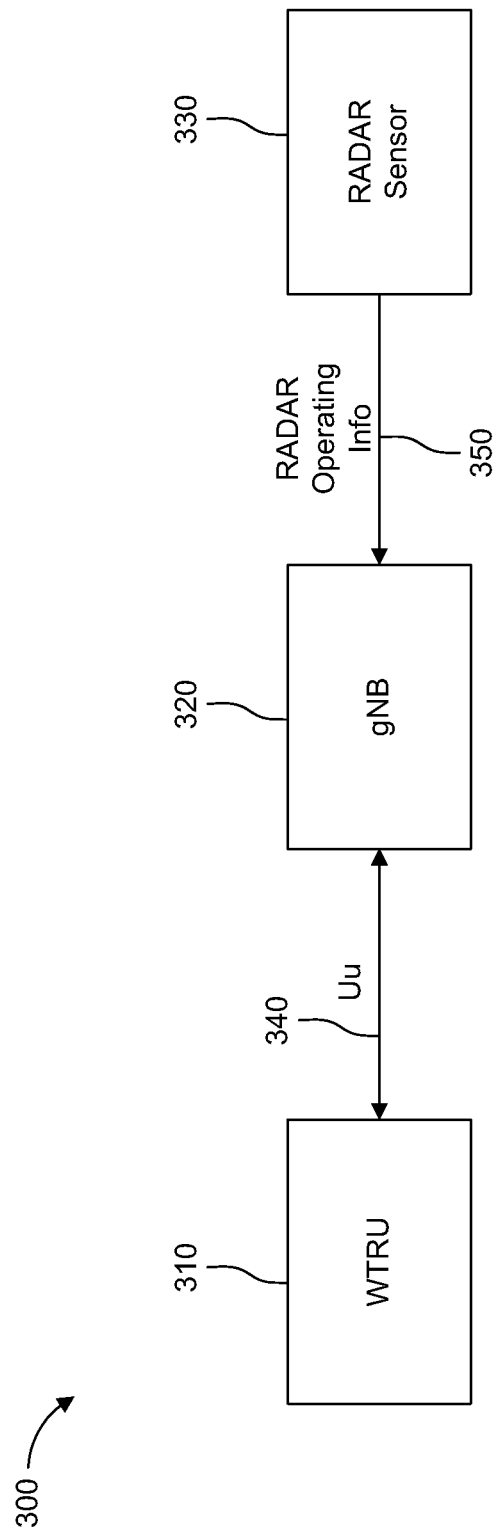
FIG. 3 is an illustration of an example system architecture where a WTRU, a base station, and RADAR coexist within operational range of each other.

FIG. 3 shows an example system 300 for performing wireless communication while coexisting with RADAR interference. The system 300 includes a WTRU 310, a GNB 320, and an external or separate RADAR sensor 330. The RADAR sensor 330 detects external RADAR and provides information related to the RADAR operations 350 to the gNB 320. The gNB 320 may use the information related to the RADAR operations 350 to schedule communications with the WTRU 310 on the Uu interface 340.

Silencing periods may be used to allow RADAR measurements to be performed by an external entity, such as RADAR sensor 330 and/or the network node, such as gNB 320. In one example, the silencing periods may be implemented by the network node as scheduling gaps (e.g., the network node may not schedule UL/DL transmissions during the period(s) when the measurements are being performed).

The determination of the reserved resources may be based on time and/or frequency information characterizing the operation of the RADAR, such as frequency, BW, and/or period. For example, the frequency and BW of the RADAR burst may be used to determine the frequency resources allocated as reserved resources; and the start time and duration of a RADAR burst may be used to determine the symbols allocated as reserved resources.

Figure 4:
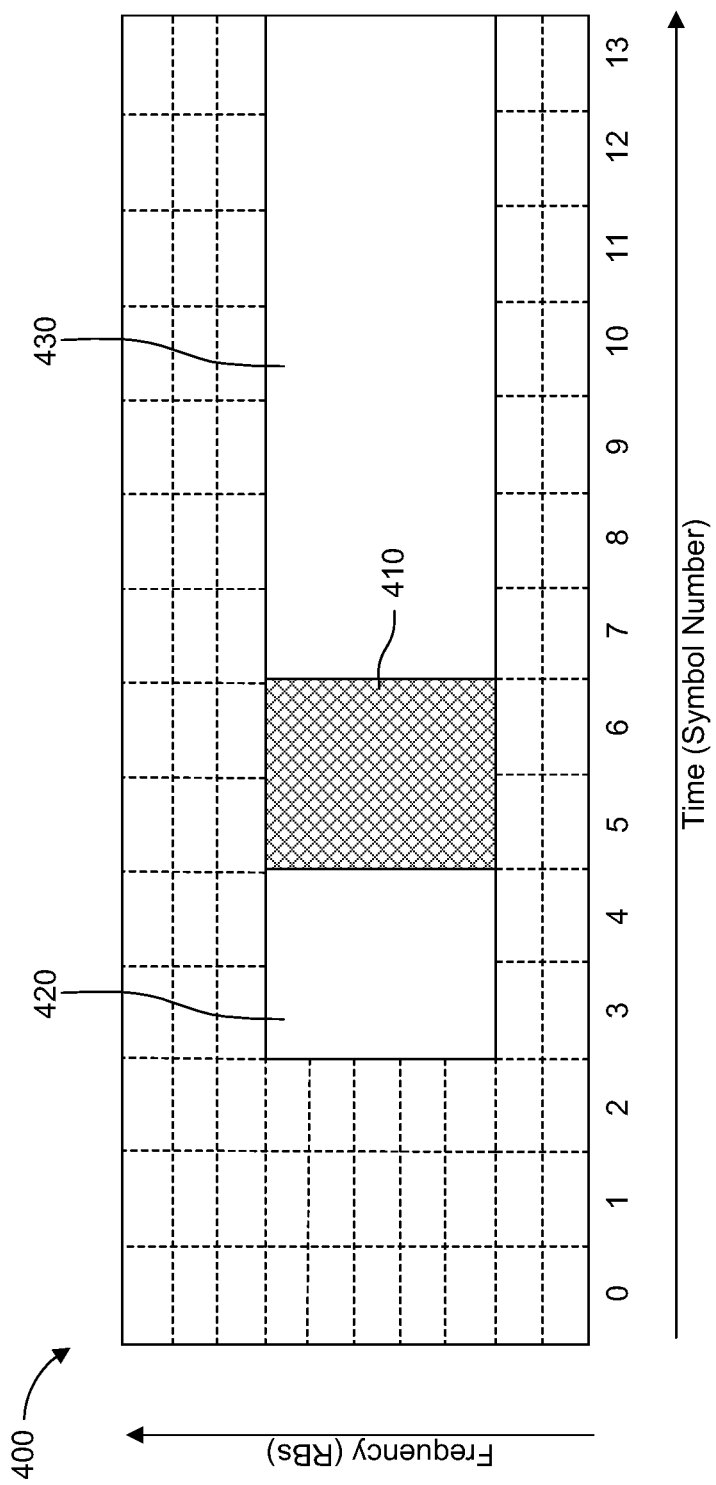
FIG. 4 is an illustration of an example of reserved resources across an entire allocated PDSCH BW.

FIG. 4 shows an example of resources assignments in a slot 400. In the slot 400, some frequency resources in time symbols 5 and 6 may incur RADAR interference. Accordingly, the shaded reserved resources 410 address the scenario where the RADAR is operating such that the PDSCH transmission would incur interference during symbols 5 and 6 across the entire allocated PDSCH BW. Symbols 3-5 420 and 7-13 430 remain available for PDSCH transmissions. The frequency and BW of the RADAR burst may be used to determine the frequency resources allocated as reserved resources; and the start time and duration of a RADAR burst may be used to determine the symbols allocated as reserved resources.

Figure 5:
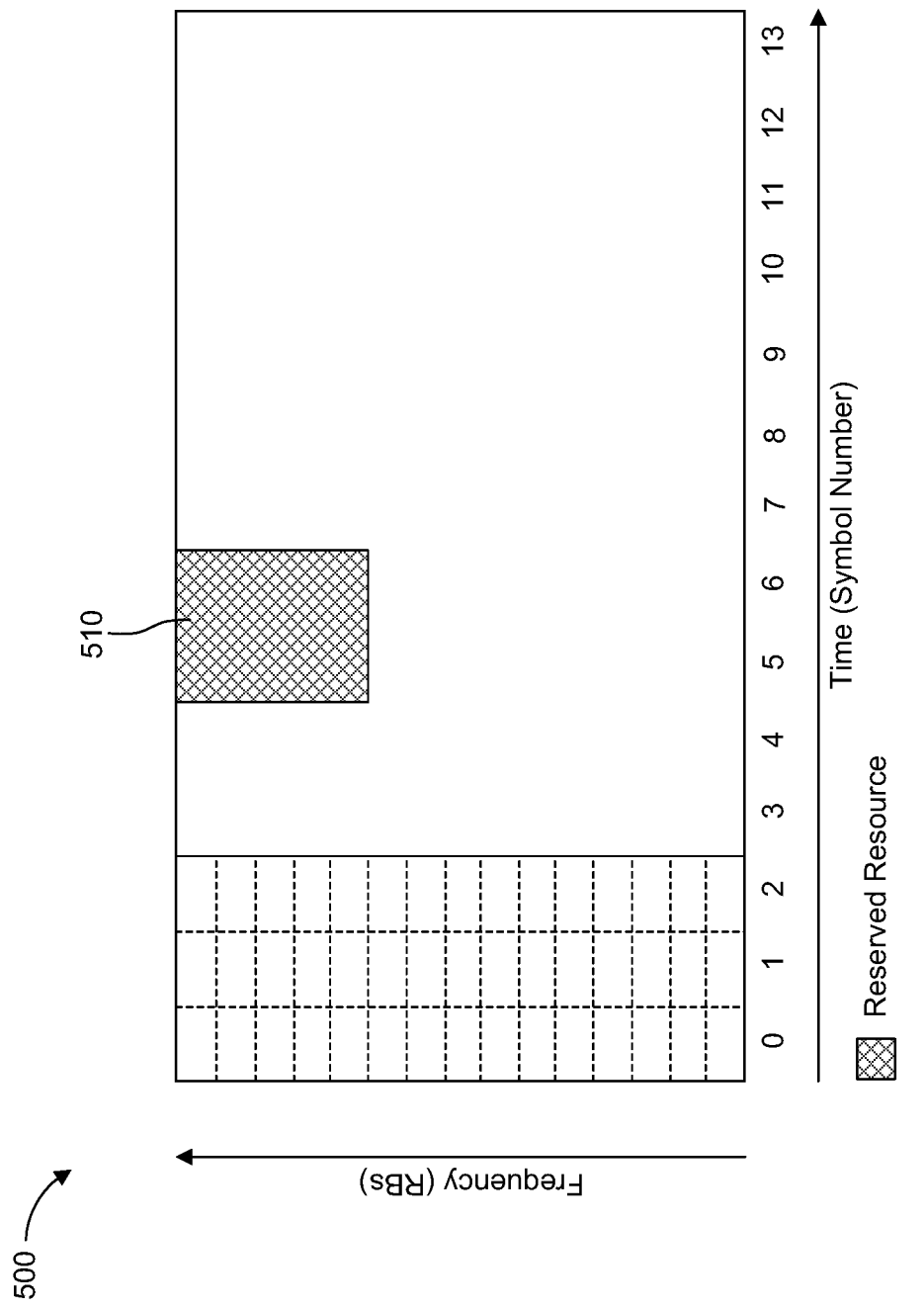
FIG. 5 is an illustration of an example of reserved resources across on the upper edge of an allocated PDSCH BW.

FIG. 5 shows an example of resources assignments in a slot 500. In the slot 500, some frequency resources in time symbols 5 and 6 may incur RADAR interference. Accordingly, the shaded reserved resources 510 address the scenario where the RADAR is operating such that the PDSCH transmission would incur interference during some parts of the allocated PDSCH bandwidth in symbols 5 and 6. The frequency and BW of the RADAR burst may be used to determine the frequency resources allocated as reserved resources; and the start time and duration of a RADAR burst may be used to determine the symbols allocated as reserved resources.

The network node may consider the direction of the PDSCH transmission when determining whether or not reserved resources are needed to coexist with the RADAR. For example, resources may only be reserved for PDSCH transmissions in directions that would otherwise incur RADAR interference.

In one example, RADAR AOA information may be used by the network node to determine the spatial direction of the RADAR interference in a cell. The network node may then use reserved resources for PDSCH transmissions to WTRUs located in areas of the cell that would otherwise incur RADAR interference.

The network node may determine a WTRU's location based on the spatial direction of an SSB or CSI-RS that is QCL-ed with the antenna port(s) used for transmission of the PDSCH. Alternatively, the WTRU's location may be determined by the network node using positioning algorithms, may be (pre) configured in the network node via an Operations, Administration and Maintenance (OAM) interface, and/or may be reported to the network node by the WTRU.

The network node may also consider the interference level when determining whether or not reserved resources are needed to coexist with the RADAR. For example, resources may only be reserved when the interference from the RADAR is above a threshold. The threshold may be preconfigured, determined dynamically, and/or provided by an external entity.

Different thresholds may be defined and selected by the network node. For example, a set of thresholds may be defined based on the MCS or modulation order; the network node may then select the appropriate threshold based on the MCS or modulation order used for the PDSCH.

In an example, the threshold may be selected based on characteristics of the data, characteristics of the service, and/or characteristics of the device (e.g., the QoS of the data being transmitted on the PDSCH, the service being provided to the device, the device type, etc.).

The (re-)configuration of the reserved resources may be done using broadcast or dedicated higher layer signaling. For scenarios where broadcast signaling is used, a WTRU may be made aware of the change to the reserved resources configuration by setting the systemInfoModification bit of the short message. The WTRU may then acquire the new reserved resources configuration using the SI acquisition procedure at the start of the next modification period.

Alternatively, WTRU-group common signaling may be used to indicate the reserved resource configuration has changed and needs to be acquired at the start of the next modification period. Which WTRUs are configured to receive the group-common signaling may be based on which WTRUs will/do incur RADAR interference.

Alternatively, broadcast or dedicated higher layer signaling may be used to configure the reserved resources, and a field in the DCI may be used to enable or disable the reserved resources depending on whether or not the WTRU will/does incur interference from the RADAR. The DCI may correspond to a DL assignment that is used to dynamically enabled/disable the reserved resources for a given PDSCH transmission. Alternatively, WTRU-group common signaling or a MAC-CE could be used to enable/disable the reserved resources.

In one approach, DMRS resources may be reserved. For example, RADAR interference may occur for any of the time and/or frequency resources allocated for PDSCH transmission, including those used for DMRS. To ensure there is an opportunity to transmit the DMRS when coexisting with RADAR, the DMRS opportunity/opportunities may be flexibly defined such that if a DMRS resource is reserved, the DMRS may be remapped to another symbol of the slot (e.g., the first symbol following the reserved DMRS resource, the first symbol prior to the reserved DMRS source, etc.).

Figure 6:
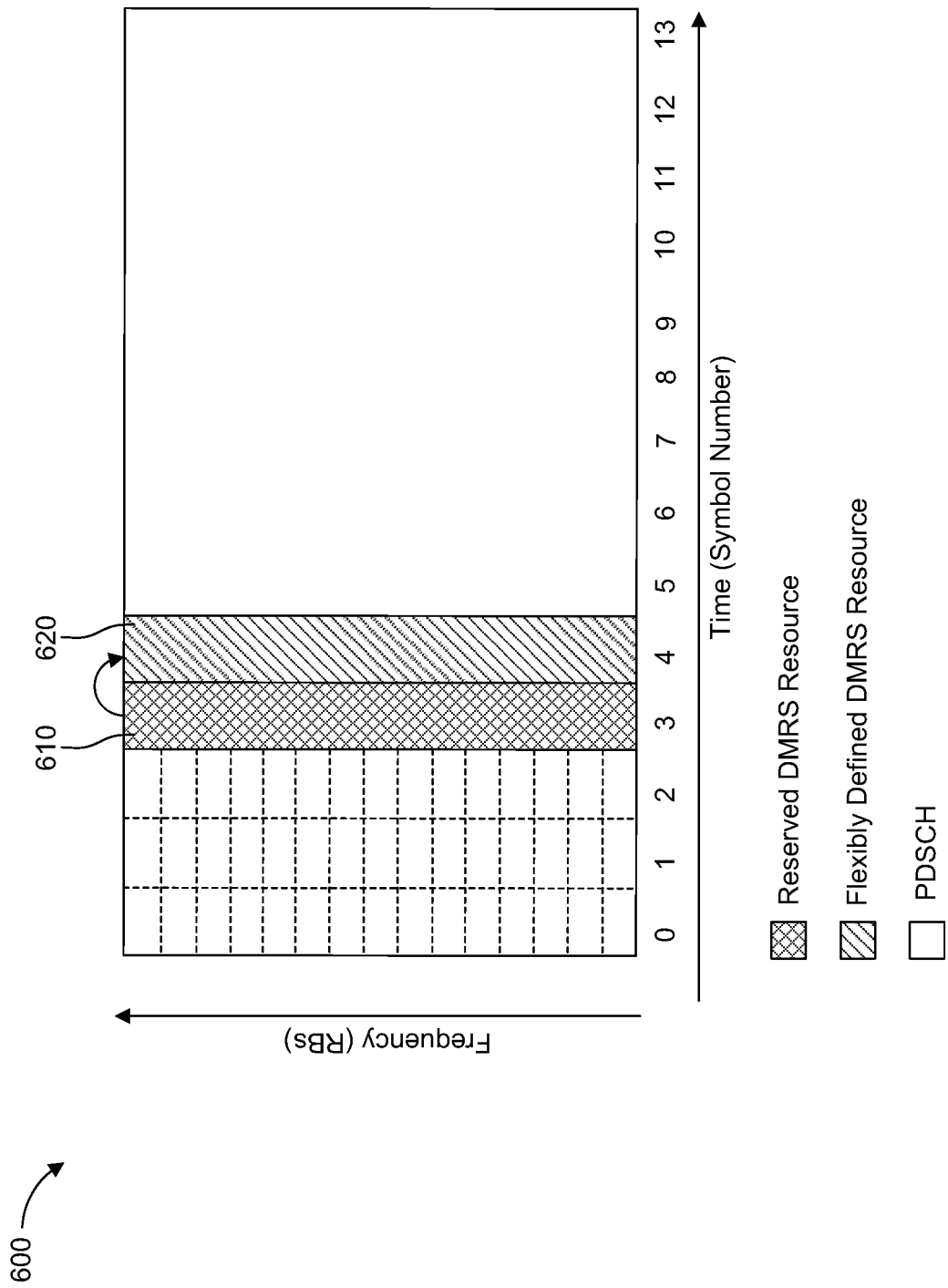
FIG. 6 is an illustration of an example of flexibly defined DMRS resource when one DMRS position is configured.

FIG. 6 is an example of the slot 600 where a reserved DMRS resource configured for symbol three 610 of the allocated PDSCH is remapped to symbol four 620.

Figure 7:
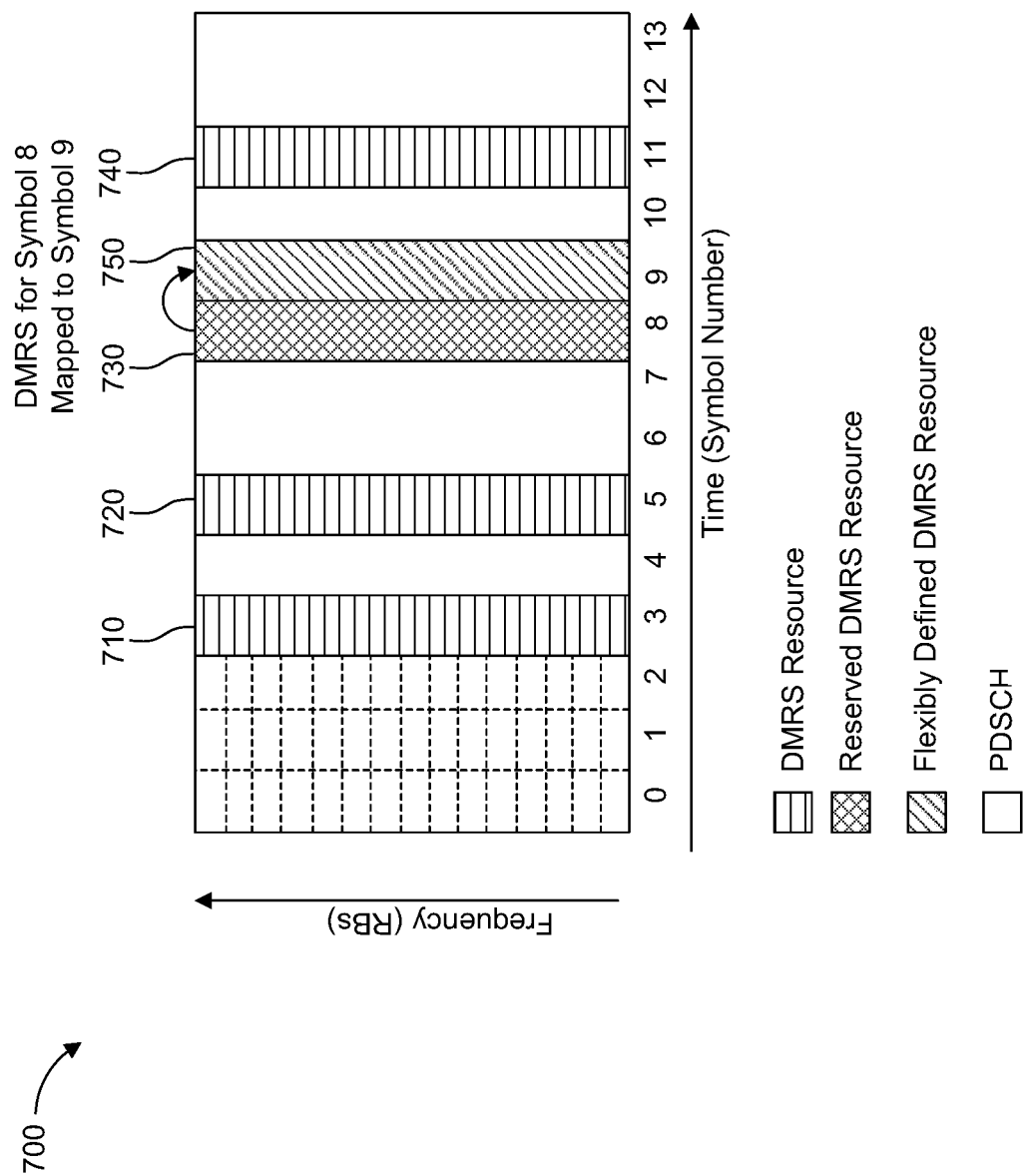
FIG. 7 is an illustration of an example of flexibly defined DMRS resource when additional DMRS positions are configured.

FIG. 7 is an example where flexibly defined DMRS resources may also be applied for configurations where additional DMRSs are configured. In FIG. 7, a slot 700 has four DMRS resources 710, 720, 730, 740 that configured for the allocated PDSCH, with the DMRS resource configured for symbol eight 730 being reserved and remapped to symbol nine 750.

Figure 8:
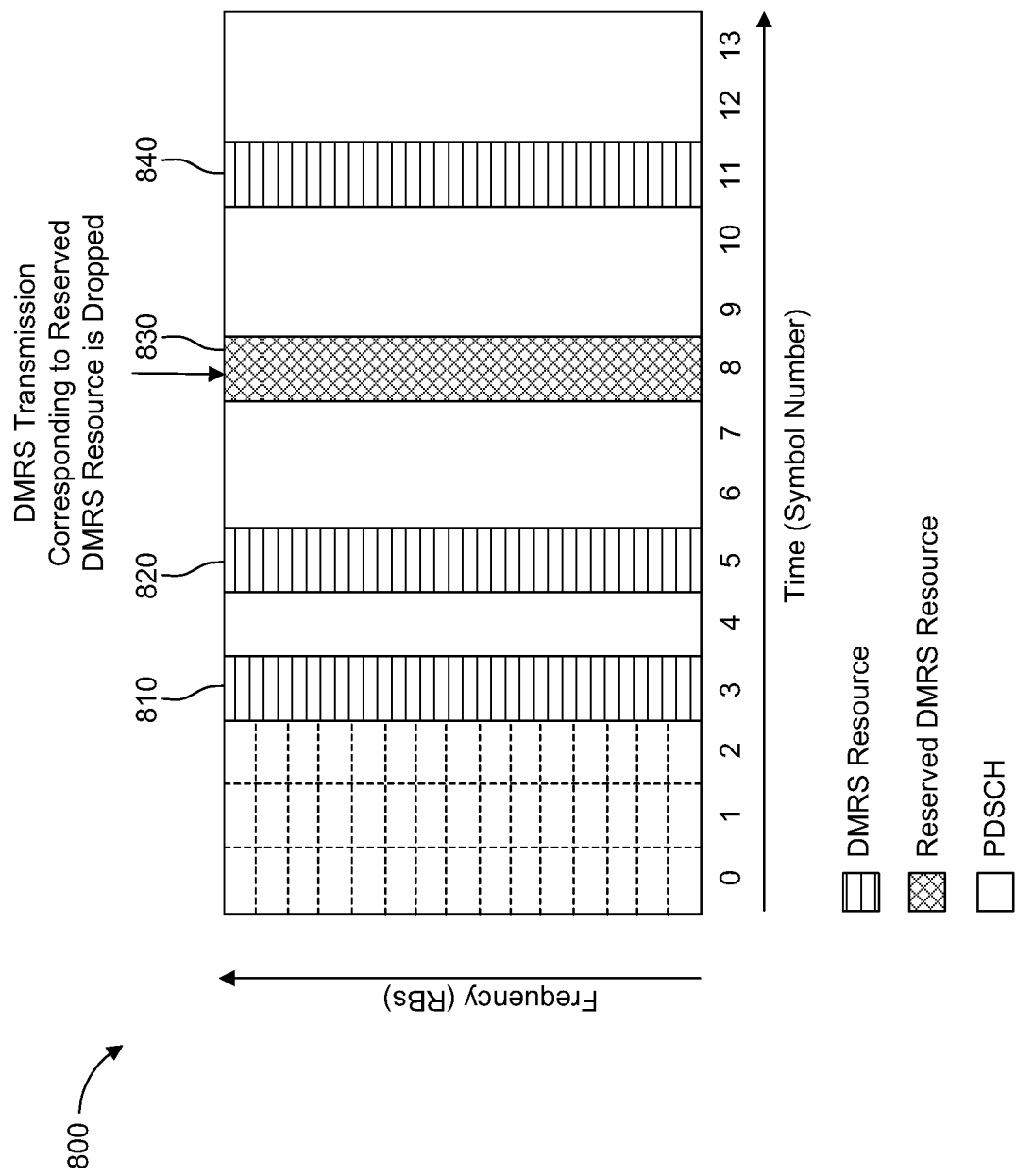
FIG. 8 is an illustration of an example of dropping a DMRS resource when additional DMRS positions are configured.

FIG. 8 is an example where additional DMRS positions are configured, the DMRS mapped to the reserved DMRS resource may be "dropped" instead of being remapped since the other DMRSs may be used by the WTRU to perform channel estimation. In example slot 800, four DMRS resources 810, 820, 830, 840 are configured for the allocated PDSCH, with the DMRS transmission corresponding to the reserved DMRS in symbol eight 830 being dropped.

The configuration of additional DMRS positions may be semi-statically configured via higher layer signaling. Alternatively, DCI may be used to indicate the configuration of additional DMRS positions to apply. For example, the DCI used to schedule the PDSCH may include a field (e.g., dmrs-AdditionalPosition, set to a value corresponding to the additional DMRS position configuration; e.g., pos0, pos1, pos2 or pos3).

The configuration of additional DMRS positions may be advantageous when coexisting with a RADAR as it allows for additional DMRS transmission opportunities, but may also result in additional DMRS overhead. To reduce the DMRS overhead, the network node may only configure additional DMRS positions for WTRUs that are expected to incur interference from the RADAR, where the RADAR interference level incurred by a WTRU may be determined using the procedures described herein.

In one approach, reserved resources may be adapted for timing drift. For example, time synchronization may not be assumed between the network node and RADAR, therefore, the pattern of symbols that incur RADAR interference may drift over time. The network node may reconfigure the reserved resources as the symbols that incur RADAR interference drift over time.

Figure 9:
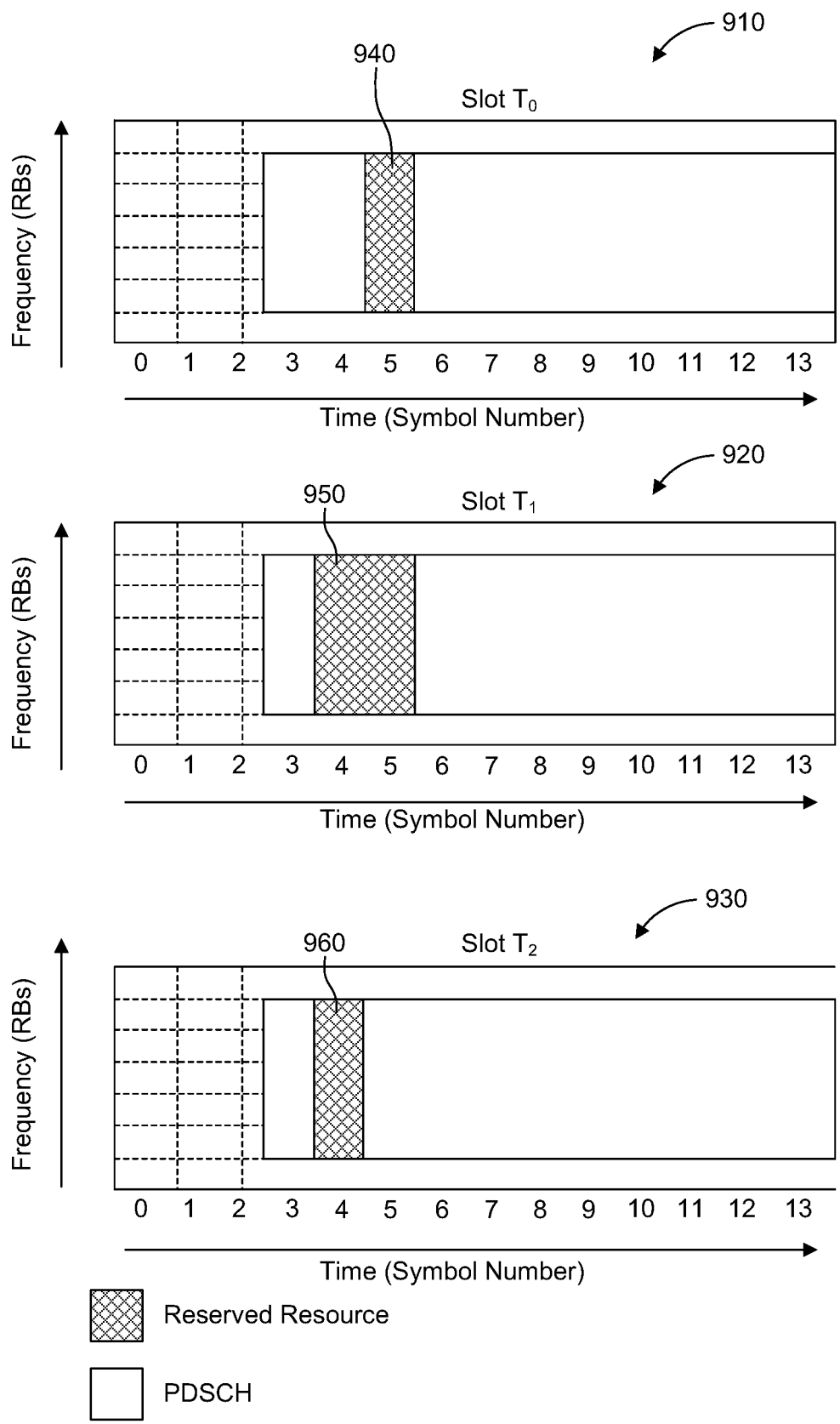
FIG. 9 is an illustration of an example of adaption of reserved resources for timing drift.

FIG. 9 is an illustration of an example of a slots t0 910, t1 920, and t3 930, where symbol 5 940 incurs RADAR interference in slot t0 910; symbols 4 and 5 950 incur interference in slot t1 920; and symbol 4 960 incurs interference in slot t2 930. In this example, the time duration of the RADAR interference may be assumed to be less than or equal to the time duration of a symbol and the timing of the RADAR interference drifts over times t0, t1, and t2. The same concept may also be applied to scenarios where the time duration of the RADAR interference is greater than the time duration of a symbol.

The reconfiguration of the reserved resources may be done using broadcast or dedicated higher layer signaling. For scenarios where broadcast signaling is used, a WTRU may be made aware of the change to the reserved resources configuration by setting the systemInfoModification bit of the short message. The WTRU may then acquire the new reserved resources configuration using the SI acquisition procedure at the start of the next modification period.

Alternatively, WTRU-group common signaling may be used to indicate the reserved resource configuration has changed and needs to be acquired at the start of the next modification period. Which WTRUs are configured to receive the WTRU-group common signaling may be based on which WTRUs will/do incur RADAR interference.

In one approach, PDSCH transmissions may be aggregated to address interference (e.g., RADAR). For instance, to coexist with a RADAR, a network node may configure PDSCH aggregation for WTRUs that may incur interference from RADAR. The configuration of PDSCH aggregation may be triggered for a WTRU when the RADAR interference exceeds a threshold. The threshold may be preconfigured, determined dynamically or provided by an external entity. Different thresholds may be defined and selected by the network node. For example, a set of thresholds may be defined based on the MCS or modulation order. The network node would then select the appropriate threshold based on the MCS or modulation order used for the PDSCH. And in other examples, the threshold may be selected based on characteristics of the data, characteristics of the service and/or characteristics of the device (e.g., the QoS of the data being transmitted on the PDSCH, the service being provided to the device, the device type, etc.).

The network node may use information characterizing the operation of the RADAR to determine the interference level. In one example, RADAR AOA information may be used by the network node to determine the spatial direction of the RADAR interference in the cell. The network node may then configure PDSCH aggregation for WTRUs located in areas of the cell that incur RADAR interference exceeding a threshold.

The network node may determine a WTRU's location based on the spatial direction of an SSB or CSI-RS that is QCL-ed with the antenna port(s) used for transmission of the PDSCH. Alternatively, the WTRU's location may be determined by the network node using positioning algorithms, may be (pre) configured in the network node via an OAM interface, and/or may be reported to the network node by the WTRU.

The load in a cell (e.g., number of Connected Mode WTRUs) may be used when determining whether or not PDSCH aggregation is configured. For example, when the network node is loaded below threshold (e.g., a light load), the capacity provided by the time/frequency resources that do not incur interference from the RADAR may be sufficient to accommodate the downlink traffic requirements for the Connected Mode WTRUs. In such a scenario, PDSCH aggregation may not be configured to coexist with the RADAR. And when the capacity provided by the time/frequency resources that do not incur interference from the RADAR is not sufficient to accommodate the downlink traffic requirements for the Connected Mode WTRUs, PDSCH aggregation may be configured for some or all of the WTRUs to coexist with the RADAR. The determination of the capacity provided by the time/frequency resources that do not incur interference from the RADAR may be based on time/frequency information characterizing the operation of the RADAR; (e.g., frequency, BW, period).

The network node may consider the interference level when determining the pdsch-AggregationFactor. For example, thresholds may be used to define the pdsch-AggregationFactor over a range of interference levels as shown in Table 2.

TABLE 2

| pdsch-AggregationFactor | |
| --- | --- |
| Interference Level | pdsch-AggregationFactor |
| Interference Level < $Threshold_1$ | 1 |
| $Threshold_1$ ≤ Interference Level < $Threshold_2$ | 2 |
| $Threshold_2$ ≤ Interference Level < $Threshold_3$ | 4 |
| $Threshold_3$ ≤ Interference Level | 8 |

Broadcast or dedicated higher layer signaling may be used for (re-)configuration of PDSCH aggregation. Alternatively, DCI may be used to configure PDSCH aggregation. For example, a field in the DCI (e.g., pdsch-AggregationFactor), may be used to configure the pdsch-AggregationFactor to be used for a given PDSCH transmission.

In an alternative, broadcast or dedicated higher layer signaling may be used to configure the pdsch-AggregationFactor and a field (e.g., pdschAggregation) in the DCI may be used to dynamically enable or disable PDSCH aggregation for a given PDSCH transmission. For example, a pdschAggregation value of 0 could be used to indicate PDSCH aggregation is disabled (e.g., pdsch-AggregationFactor=1, and a value of 1 could be used to indicate PDSCH aggregation is enabled; pdsch-AggregationFactor=value configured by higher layers). In an alternative, WTRU-group common signaling or a MAC-CE may be used to enable/disable PDSCH Aggregation.

In one approach, power boosting may be used to address interference (e.g., RADAR). For example, to coexist with a RADAR, a network node may use power boosting for WTRUs that incur interference from RADAR. Power boosting may be triggered for a WTRU when the RADAR interference exceeds a threshold. The threshold may be preconfigured, determined dynamically, and/or provided by an external entity. Different thresholds may be defined and selected by the network node. For example, a set of thresholds may be defined based on the MCS and/or modulation order. The network node may then select the appropriate threshold based on the MCS and/or modulation order used for the PDSCH. In one example, the threshold may be selected based on characteristics of the data, characteristics of the service, and/or characteristics of the device (e.g., the QoS of the data being transmitted on the PDSCH, the service being provided to the device, the device type, etc.).

The network node may use information characterizing the operation of the RADAR to determine the interference level. In one example, RADAR AOA information may be used by the network node to determine the spatial direction of the RADAR interference in the cell. The network node may then use power boosting for WTRUs located in areas of the cell that will incur RADAR interference exceeding a threshold.

The network node may determine a WTRU's location based on the spatial direction of an SSB or CSI-RS that is QCL-ed with the antenna port(s) used for transmission of the PDSCH. Alternatively, the WTRU's location may be determined by the network node using positioning algorithms, may be (pre) configured in the network node via an OAM interface, or may be reported to the network node by the WTRU.

The power boosting may be applied for all allocated resources that will/do incur interference from the RADAR. Alternatively, the power boosting may only be applied for DMRS resources. And in yet another alternative, the power boosting may be applied for all resources allocated to the PDSCH whether or not the resource will/does incur RADAR interference from the RADAR.

In some cases, one or more network nodes (e.g., network node), may perform one or more of the following steps: receiving information characterizing the operation of a RADAR; based on the received information, determining the time/frequency resources that may incur interference from the RADAR; based on the determined time/frequency resources, configuring a WTRU with a set of reserved time/frequency resources that may not be used for PDSCH reception; and/or transmitting a PDSCH to the WTRU using RBs that do not comprise resources from the set of reserved time/frequency resources.

The information characterizing the operation of a RADAR may include, but is not limited to, angle of arrival, frequency, and/or bandwidth. The configuring a WTRU with a set of reserved time/frequency resources may further comprise: determining the WTRU will/does incur interference from the RADAR based on the WTRU's location in the cell. The determining the WTRUs location may be based on the spatial direction of an SS/PBCH block (SSB) or Channel State Information Reference Signal (CSI-RS) that is Quasi-Collocated (QCL-ed) with the antenna port(s) used for transmission of the PDSCH. The determining the time/frequency resources that may incur interference from the RADAR may further comprise: determining the interference from the RADAR is above a threshold. The modulation and coding scheme (MCS) of the PDSCH may be used to select the threshold from a set of thresholds based on the MCS. The set of reserved time/frequency resources corresponds to RBs in one or more of the symbols allocated for the PDSCH transmission. The set of reserved time/frequency resources are configured via broadcast higher layer signaling, and dynamically enabled/disabled via Downlink Control Information (DCI). The reserved time/frequency resources correspond to a Demodulation Reference Signal (DMRS) resource that is remapped to the first symbol following the reserved DMRS resource. The reconfiguration of the reserved time/frequency resources may be triggered in response to timing drift between the network node and RADAR.

In some cases, one or more network nodes (e.g., a network node), may perform one or more of the following steps: receiving information characterizing the operation of a RADAR; based on the received information, determining the time/frequency resources that may incur interference from the RADAR; determining a set of RBs to be allocated to a WTRU for PDSCH transmission; determining the set of RBs comprises time/frequency resources that may incur interference from the RADAR; determining the PDSCH aggregation factor to be used to overcome interference from the RADAR; configuring the WTRU to receive the PDSCH using PDSCH aggregation; and/or transmitting the PDSCH to the WTRU using PDSCH aggregation.

The information characterizing the operation of a RADAR may include, but is not limited to, angle of arrival, frequency, and/or bandwidth. The determining the set of RBs comprises time/frequency resources that may incur interference from the RADAR may further comprise: determining the WTRU will/does incur interference from the RADAR based on the WTRU's location in the cell. The WTRUs location may be determined based on the spatial direction of an SSB or CSI-RS that is QCL-ed with the antenna port(s) used for transmission of the PDSCH. The determining the time/frequency resources that may incur interference from the RADAR may further comprise determining that the interference from the RADAR exceeds a threshold. The MCS of the PDSCH may be used to select the threshold from a set of thresholds based on the MCS. The PDSCH aggregation factor may be determined based on one or more of the following: the MCS of the PDSCH; the interference from the RADAR exceeding a threshold; and/or the Quality-of-Service (QoS) of the data being transmitted on the PDSCH. The PDSCH aggregation factor may be configured via broadcast higher layer signaling, and PDSCH aggregation may be dynamically enabled/disabled via DCI.

In some cases, one or more network nodes (e.g., a network node), may perform one or more of the following steps: receiving information characterizing the operation of a RADAR; based on the received information, determining the time/frequency resources that may incur interference from the RADAR; determining a set of RBs to be allocated to a WTRU for PDSCH transmission; determining which resources allocated to a WTRU for PDSCH transmission will/does require power boosting to overcome interference from the RADAR; and/or transmitting a PDSCH to the WTRU using power boosting.

The information characterizing the operation of a RADAR may include, but is not limited to, angle of arrival, frequency, and/or bandwidth. The determining which resources allocated to a WTRU for PDSCH transmission that may require power boosting to overcome interference from the RADAR may further comprise: determining the WTRU will/does incur interference from the RADAR based on the WTRU's location in the cell. The WTRUs location may be determined based on the spatial direction of an SSB or CSI-RS that is QCL-ed with the antenna port(s) used for transmission of the PDSCH. The determining the time/frequency resources that may incur interference from the RADAR may further comprise determining that the interference from the RADAR exceeds a threshold. The MCS of the PDSCH may be used to select the threshold from a set of thresholds based on the MCS.

In each of the above cases, embodiments, examples, a reciprocal process may occur at the WTRU and is hereby included.

As described herein, a higher layer may refer to one or more layers in a protocol stack, or a specific sublayer within the protocol stack. The protocol stack may comprise of one or more layers in a WTRU or a network node (e.g., eNB, gNB, other functional entity, etc.), where each layer may have one or more sublayers. Each layer/sublayer may be responsible for one or more functions. Each layer/sublayer may communicate with one or more of the other layers/sublayers, directly or indirectly. In some cases, these layers may be numbered, such as Layer 1, Layer 2, and Layer 3. For example, Layer 3 may comprise of one or more of the following: Non Access Stratum (NAS), Internet Protocol (IP), and/or Radio Resource Control (RRC). For example, Layer 2 may comprise of one or more of the following: Packet Data Convergence Control (PDCP), Radio Link Control (RLC), and/or Medium Access Control (MAC). For example, Layer 3 may comprise of physical (PHY) layer type operations. The greater the number of the layer, the higher it is relative to other layers (e.g., Layer 3 is higher than Layer 1). In some cases, the aforementioned examples may be called layers/sublayers themselves irrespective of layer number, and may be referred to as a higher layer as described herein. For example, from highest to lowest, a higher layer may refer to one or more of the following layers/sublayers: a NAS layer, a RRC layer, a PDCP layer, a RLC layer, a MAC layer, and/or a PHY layer. Any reference herein to a higher layer in conjunction with a process, device, or system will refer to a layer that is higher than the layer of the process, device, or system. In some cases, reference to a higher layer herein may refer to a function or operation performed by one or more layers described herein. In some cases, reference to a high layer herein may refer to information that is sent or received by one or more layers described herein. In some cases, reference to a higher layer herein may refer to a configuration that is sent and/or received by one or more layers described herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented by a base station, the method comprising:
   receiving radio detection and ranging (RADAR) structured parameters including an angle of arrival (AOA), frequency information, and bandwidth (BW);
   sending scheduling information for transmitting to a wireless transmit receive unit (WTRU), wherein the scheduling information is associated with a spatial direction and indicates a set of time and frequency resources associated with a physical downlink transmission that avoid RADAR interference, and wherein the set of time and frequency resources is determined based on the RADAR structured parameters and a location of the WTRU; and
   sending the physical downlink transmission using resources based on the set of time and frequency resources.

2. The method of claim 1, wherein the set of time and frequency resources are further based on a RADAR interference threshold.

3. The method of claim 1, wherein the set of time and frequency resources are further based on a timing drift associated with RADAR.

4. The method of claim 1, wherein the physical downlink transmission includes a physical downlink shared channel transmission.

5. The method of claim 1, wherein the scheduling information is sent in a downlink control information.

6. A base station comprising:
   a transceiver;
   a processor connected to the transceiver, wherein the processor and transceiver are configured to:
      receive radio detection and ranging (RADAR) structured parameters including angle of arrival (AOA), frequency, and bandwidth (BW), usable by the base station for determining time and frequency resources for transmission scheduling;
      send scheduling information for transmitting to a wireless transmit receive unit (WTRU), wherein the scheduling information is associated with a spatial direction and indicates a set of time and frequency resources associated with a physical downlink transmission that avoid RADAR interference, and wherein the set of time and frequency resources is determined based on the RADAR structured parameters and a location of the WTRU; and
      send the physical downlink transmission using resources based on the set of time and frequency resources.

7. The base station of claim 6, wherein the set of time and frequency resources are further based on a RADAR interference threshold.

8. The base station of claim 6, wherein the set of time and frequency resources are further based on a timing drift associated with RADAR.

9. The base station of claim 6, wherein the physical downlink transmission includes a physical downlink shared channel transmission.

10. The base station of claim 6, wherein the scheduling information is sent in a downlink control information.

* * * * *